(12) United States Patent
Heiburg

(10) Patent No.: US 6,936,088 B2
(45) Date of Patent: Aug. 30, 2005

(54) SINTERED, HIGHLY POROUS BODY AND METHOD FOR THE PRODUCTION THEREOF

(75) Inventor: Klaus Heiburg, Radevormwald (DE)

(73) Assignee: GKN Sinter Metals GmbH (GB)

(*) Notice: Subject to any disclaimer, the term of this patent is extended or adjusted under 35 U.S.C. 154(b) by 44 days.

(21) Appl. No.: 10/661,694

(22) Filed: Sep. 12, 2003

(65) Prior Publication Data

US 2004/0166011 A1 Aug. 26, 2004

Related U.S. Application Data

(63) Continuation of application No. PCT/EP02/01678, filed on Feb. 16, 2002.

(30) Foreign Application Priority Data

Mar. 13, 2001 (DE) .......................... 101 11 892

(51) Int. Cl.$^7$ ................. B22F 3/00; F23D 3/40
(52) U.S. Cl. ....................... 75/229; 431/326
(58) Field of Search ................. 75/229; 431/326

(56) References Cited

U.S. PATENT DOCUMENTS

| | | | |
|---|---|---|---|
| 4,729,871 A | | 3/1988 | Morimoto .................. 419/2 |
| 5,161,965 A | * | 11/1992 | Nakamura .................. 431/328 |
| 5,350,620 A | * | 9/1994 | Sundet et al. ................ 428/172 |
| 6,152,978 A | * | 11/2000 | Lundquist .................. 55/385.1 |
| 6,303,538 B1 | * | 10/2001 | Toia et al. .................. 502/439 |
| 6,558,810 B2 | * | 5/2003 | Garbo ........................ 428/549 |
| 6,607,998 B1 | * | 8/2003 | Lambert et al. ............. 442/402 |
| 2002/0006506 A1 | * | 1/2002 | Hanzawa et al. ......... 428/293.1 |
| 2002/0142202 A1 | * | 10/2002 | Li et al. ....................... 429/27 |

FOREIGN PATENT DOCUMENTS

| | | |
|---|---|---|
| DE | 19 11 941 | 9/1970 |
| DE | 44 01 799 C1 | 6/1995 |
| DE | 195 07 645 C1 | 8/1996 |
| DE | 197 36 971 A1 | 3/1999 |
| DE | 199 24 675 A1 | 11/2000 |
| DE | 199 63 698 A1 | 7/2001 |
| EP | 1 193 009 A2 | 4/2002 |
| WO | WO 99/54524 | 10/1999 |

* cited by examiner

Primary Examiner—Ngoclan T. Mai
(74) Attorney, Agent, or Firm—Woodcock Washburn LLP

(57) ABSTRACT

The invention relates to a sintered highly porous body comprising at least one layer that is made of a material, which can be sintered and which contains fibers. The aim of the invention is to provide a body of the aforementioned type with improved burn-off properties and values for the flame adherence. To this end, the fibers used are curved on one and/or both sides and they have a principal axis that is shorter than approximately 1 mm and a secondary axis that is shorter than approximately 200 μm, whereby the principal axis is longer than the secondary axis. The invention also relates to a method for producing the sintered porous bodies and to the use thereof.

28 Claims, 1 Drawing Sheet

SINTERED, HIGHLY POROUS BODY AND METHOD FOR THE PRODUCTION THEREOF

This is a continuation of PCT/EP02/01678 filed Feb. 16, 2002, which claims priority to German Application No. 101 11 892.9 filed Mar. 13, 2001.

BACKGROUND OF THE INVENTION

The present invention concerns a sintered, highly porous body comprising at least one layer that is made of a sinterable material, which comprises fibers, as well as a method for producing said bodies and the use thereof.

Sintered, highly porous bodies are used for several technical purposes. In particular they are used as combustion elements, as due to their porosity they are able to absorb liquid fuel temporarily and to evaporate it at the surfaces of the element. Such combustion elements have to stand correspondingly high temperatures. Sintered, highly porous bodies are in particular also used in auxiliary heatings of automobiles.

From the state of art it is known to produce highly porous bodies from sinterable metal powders. However, by using such metal powders, porosities can be achieved, which merely have dimensions of slightly more than approximately 60%. To achieve higher porosities it is furthermore known to use sinterable metal fibers. Such sinterable metal fibers can subsequently interweaved into fibrous webs, which are then sintered. Such fibrous webs can have porosities of up to nearly 90%.

The possibility to use highly porous bodies in particular as combustion elements requires good burn-off properties and values for the flame adherence. At the same time, such elements must have high porosities. However, the higher the porosity of the body, the lower values can be achieved for the flame adherence and the burn-off properties of the body.

It is the object of the present invention to provide sintered, highly porous bodies, which do not show the afore mentioned disadvantages.

SUMMARY OF THE INVENTION

According to the invention this problem is solved by providing a sintered, highly porous body comprising at least one layer made of sinterable material that comprises fibers with a hemiellipsoidal cross section, which are curved on one side and largely flat on the other side, and have a principal axis that is shorter than 1 mm and a secondary axis that is shorter than 200 $\mu$m, whereby the principal axis is longer than the secondary axis. Such sintered, highly porous bodies have significantly improved values for the burn-off properties and for the flame adherence, in comparison to sintered bodies made of conventional metal fibers, especially when they are manufactured into fibrous webs, as known from the state of art. The fibers have a larger specific surface, which causes improved properties compared to metal fibers, which may be manufactured into fibrous webs and are known from the state of art. As an advantage, the used fibers have sharp edges, which has an activating effect especially if they are used to expedite combustion, for example in the case of evaporating liquid fuels.

'Sinterable materials' in the sense of the invention mean materials produced from metals, metal oxides, ceramics and/or plastics. Usable metallic materials in the sense of the invention are not only materials made of pure metals, but also materials made of metal alloys and/or material mixtures from different metals and metal alloys. These comprise in particular steels, preferably chrome-nickel steels, bronzes, nickel master alloys, Hastalloy, Inconel or suchlike, whereby the material mixtures may also contain high-melting elements, as for example platinum. The used fibers may be metallic or ceramic. Especially preferred as fibers ferrous products (for example according to material standard 1.0495, 1.4113 or 1.4841) and/or alloys on the base iron-chrome-aluminium or nickel-aluminium are used. Aluminious alloys are hereby preferred, as these have a high temperature stability and a high corrosion resistance. Preferred hereby are aluminium contents in a range of about 10 to 40 weight % referred to the total quantity of the metals contained in the alloy. Further preferred, the sintered, highly porous body according to the invention is exclusively made of metallic fibers. However, in the sense of the invention mixtures from powders with fibers can also be used as sinterable materials.

If the fibers in the body according to the invention are curved on both of their sides, their cross section can more or less be described as elliptical. If such a fiber is divided along its longitudinal axis and in direction of the principal axis, a fiber is received, which is shaped more or less hemiellipsoidally. Such fibers being curved only on one side are especially preferred, as these have a further increased specific surface, by which the required bum-off properties and values for the flame adherence are further increased. Such fibers thus have a flat and a curved side.

Especially preferred, the principal axis of the fiber is shorter than approximately 500 $\mu$m and the secondary axis is shorter than approximately 100 $\mu$m. The length of the principal axis and the secondary axis is defined by means of a times 100 to about 500 microscope considering the cross-section polish of the fibers.

Furthermore, the used fibers preferably have different lengths, which causes the formation of a very stable fiber matrix during the sintering process. This can even be improved in a further preferred embodiment of the invention by using fibers, which are buckled at least once along the longitudinal axis. Thus, the interlocking between the fibers is improved, which further increases the stability of the fiber matrix. The percentage of buckled fibers in the total quantity of the used fibers is preferred in a range of at least 20 weight %.

In a further embodiment of the invention the fibers are twisted around their longitudinal axis. The percentage of such twisted fibers amounts to at least 15 weight % of the fibers, referred to their total quantity, especially preferred 40 to 60 weight %. Preferred, the fibers are twisted at least half a turn around the longitudinal axis, further preferred they have more than one twist around their longitudinal axis.

Such bodies according to the invention advantageously have higher mechanical properties, as the twist of the fibers around their longitudinal axis causes better sintering contacts. Furthermore such bodies according to the invention have better bum-off properties.

Further preferred, the length of the secondary axis of the fibers decreases from their middle towards their ends. Hereby, the length of the secondary axis in the middle of a fiber is for example in a range of approximately 100 $\mu$m, whereas the length of the secondary axis in the end of a fiber is in a range of approximately 20 $\mu$m. The relation of the length of the secondary axis in the middle of a fiber to the length of the secondary axis in the end of a fiber is preferred more than 2:1, further preferred more than 3:1. The percentage of such fibers in the body according to the invention preferred amounts to at least 20 weight % and is further preferred in a range of 15 to 50 weight %.

In a further embodiment of the invention the curved sides have recesses running crosswise to the longitudinal axis of the fibers. Due to these recesses, which may for example be groove-shaped, the curved side of the fiber shows a surface described as being undulated. Hereby, the specific surface of the fibers used in the body according to the invention is advantageously increased, which further improves its burn-off properties and values for the flame adherence.

Further preferred the body has at least one further not sintered layer. The further, not sintered layer may for example be a perforated plate or a wire fabric or the like, which is preferred made of the same material as the sinterable material, in particular the fibers.

Finally, the pore distribution in the body according to the invention advantageously is in a range of about 5 to 150 $\mu$m, preferred 10 to 100 $\mu$m. The pore distribution is hereby defined by means of a porometer according to the standard ASSME 12/94. Thereby the body according to the invention preferably has a porosity of at least 80%, preferred more than 90%, further preferred more than 93%, as well as a substance of at least 50 g/m². Such bodies according to the invention are not only highly porous, but also have particularly large specific surfaces, which influence the burn-off properties of the body according to the invention positively. In addition, the body according to the invention can absorb high quantities of fuel, particularly when it is used for example as combustion or wick element.

Furthermore, the present invention concerns a method for producing sintered, highly porous bodies with at least one layer that is made of a sinterable material, comprising fibers, whereby in a first step the fibers are cut to a length of a maximum of approximately 20 mm;

in a second step the material is applied with a pouring volume of approximately 0.2 to 0.4 g/cm²; and in a third step the material is sintered.

The shortening of the used fibers in the first step favourably causes a high mechanical stability and evenness of the bodies to be produced. By using fibers of this length applied with a pouring volume of 0.2 to 0.4 g/cm² bodies of a high mechanical strength and at the same time high evenness can be produced. Preferred, hereby it is provided, that the fibers are applied by scattering in the second step. The scattering of the fibers is effected under the impact of directed mechanical oscillations on the heap of fibers, while the fibers are filled into the pouring cast. The agitation of the heap of fibers caused by the impact of directed mechanical oscillations can for example be effected in the way that the fibers are transported from the heap of fibers to the cast via an oscillating conveyor. It may also be provided that the fibers are scattered by means of agitating the heap of fibers on a sieving surface while the fibers are filled into the cast. According to the shape of the cast an oscillating or a rotating sieving surface can be provided, onto which the heap of fibers is applied. Hereby, a relatively wide-meshed sieving surface with a mesh size of approximately 0.5 to 5 mm is sufficient. By means of agitating the heap of fibers on the sieving surface it is achieved, that fibers are loosening only in the area of the sieve pores from the heap of fibers to fall into the cast.

Furthermore, it is preferred provided, that during the scattering of the used material, particularly of the fibers, the cast agitates relatively to the material flow. The relative agitation between the material flow, for example the discharge end of an oscillating conveyor or in the underflow of a sieve, corresponds to the geometric shape of the porous body to be produced. Hereby the cast can rotate or agitate relatively to the fiber flow in a plane. If the highly porous body to be produced must have connection elements to be fixed in corresponding cases, a further embodiment of the invention provides that at least one connection element to be fixed at the porous body is inserted into the cast as a forming element and sintered as well.

Further preferred, the material is additionally compressed in a further step following the second step. Hereby, a stable porous green body is formed, which is subsequently sintered in a third step. The green body can separately be further handled. Such a green body has a high dimensional accuracy and can subsequently be sintered practically without any symptoms of shrinking to a firm and stable porous body.

Further preferred, the material is applied onto a further not sintered layer in a second step and subsequently sintered with this layer in a third step. Hereby, a firm bond between the layer made of sinterable material and the not-sintered layer can be obtained. Preferred the two layers consist of the same material. In particular, the further layer may be a perforated plate or a wire fabric.

Finally, the present invention concerns the use of the body according to the invention as evaporating or wick element in auxiliary heatings and/or additional heatings, especially in automobiles, as flame support in burners, as heat distributor plate, as combustion supporting element, as heat exchanger and/or as catalyst for heterogeneous reactions. Compared to the porous bodies known from the state of art the body according to the invention shows excellent properties in all of the afore mentioned applications, particularly regarding its flame adherence, which is due to its significantly increased specific surface. When the body according to the invention is used as a catalyst, heterogeneous reactions proceed much faster because of the increased number of edges and cants of the fibers used to produce the body according to the invention. The burn-off properties being considerable in case of the afore mentioned applications, are significantly increased for the body according to the invention.

BRIEF DESCRIPTION OF THE FIGURES

This and further advantages of the present invention are explained in more detail in the attached figures.

DETAILED DESCRIPTION OF PREFERRED EMBODIMENTS

Figure 1:
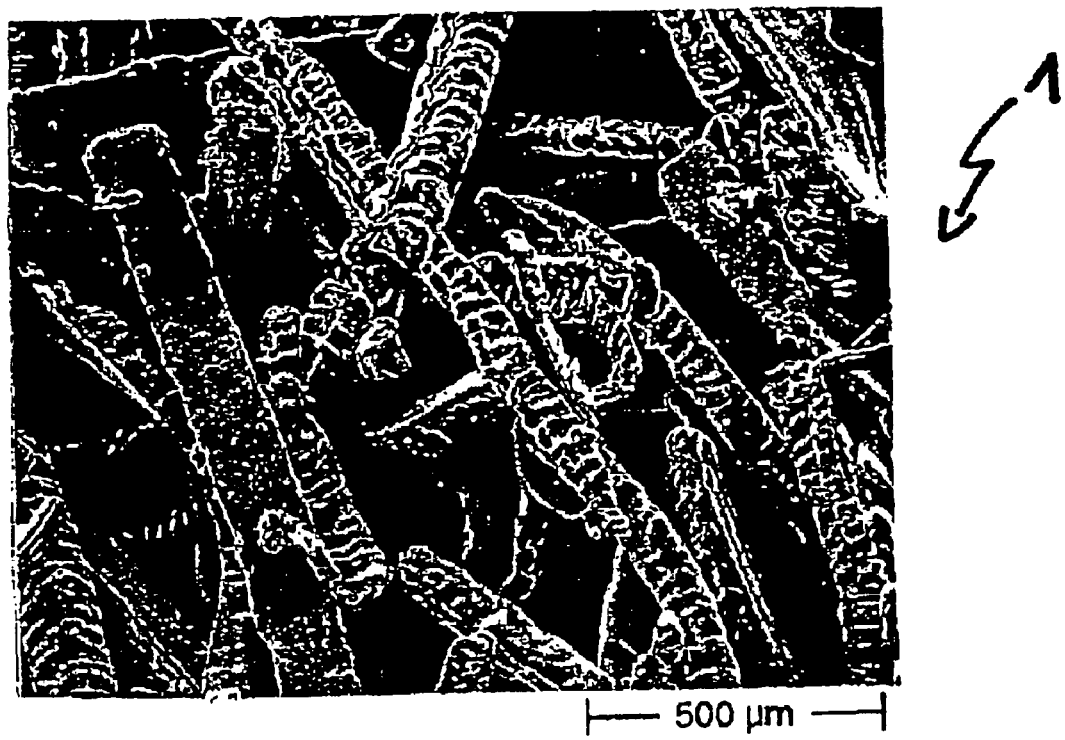
FIG. 1: shows a microscopic magnification scale 68.9:1 of a combustion element produced from a body according to the invention.

In FIG. 1 the body (combustion element), which is in total marked with the sign 1, shows fibers, which are curved on one side and whose other side however is generally flat. Thus in their cross section they are hemiellipsoidal. On their curved surface they have groove-shaped recesses (light areas). Furthermore, kinks and twists can be seen along the longitudinal axis of the fibers.

Figure 2:
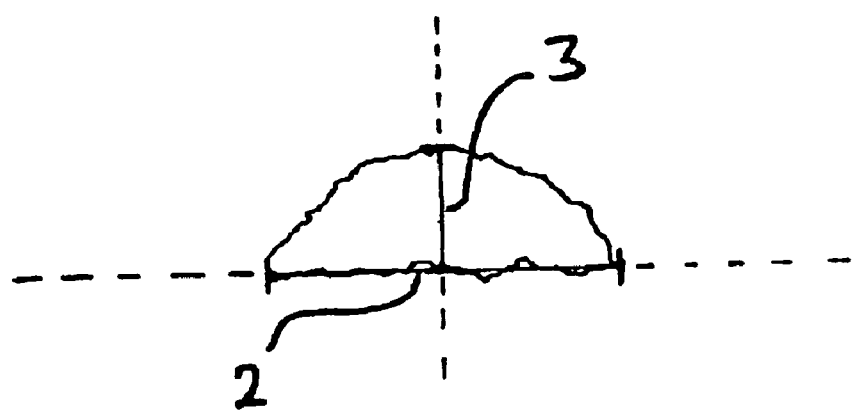
FIG. 2: shows a drawing of a cross section through a fiber used in the combustion element.

FIG. 2 shows in a drawing the design of the fibers used in the body 1, whereby the principal axis 2 and the secondary axis 3 can here be clearly identified.

The combustion element shown in FIG. 1 has a first layer made of a sinterable material, namely of fibers of the material 1.4841, which was applied onto and sintered with a further layer, namely a wire fabric with a mesh size of 2 mm. Hereby, a substance of 150 g/m² was adjusted for the fiber-containing layer. The principal axis of fibers had a length of 350 μm and their secondary axis had a length of 50 μm. The length of the fibers was in a range of approximately 5 to 15 mm. The heap of fibers applied onto the wire fabric by means of an oscillating conveyor was subsequently sintered with the wire fabric at a temperature of approximately 1,280° C. in a vacuum. Hereby, a body according to the invention was produced, which had a porosity higher than 90% and a pore distribution in a range of 12 μm to 100 μm.

The present invention provides sintered, highly porous bodies, which compared to the usual porous bodies known from the state of art, exhibit improved burn-off properties and better values for the flame adherence with the same high porosity, in particular when they are used as combustion or wick element.

What is claimed is:

1. A sintered porous body comprising at least one layer made of sinterable material that comprises fibers with a hemiellipsoidal cross section, which are curved on one side and largely flat on the other side, and having a principal axis that is shorter than 1 mm and a secondary axis that is shorter than 200 μm, whereby the principal axis is longer than the secondary axis.

2. A sintered, highly porous body according to claim 1, wherein the fibers are twisted around their longitudinal axis.

3. A sintered highly pourous body according to claim 2, wherein at least 15 weight % of the fibers are twisted.

4. A sintered highly pourous body according to claim 3, wherein 40 to 60 weight % of the fibers are twisted.

5. A sintered highly pourous body according to claim 3, wherein the twisted fibers are twisted at least half a turn around the longitudinal axis, thereby enhancing sintering contacts and burn-off properties.

6. A sintered highly pourous body according to claim 3, wherein the twisted fibers are twisted at least one twist around their longitudinal axis.

7. A sintered highly porous body according to claim 1 wherein the length of the secondary axis of the fibers decreases from their middle towards their ends.

8. A sintered highly pourous body according to claim 7, wherein the length of the secondary axis in a middle of at least a portion of the fibers is approximately 100 μm and the length of the secondary axis in an end of said portion of the fibers is approximately 20 μm.

9. A sintered highly pourous body according to claim 7, wherein for at least a portion of the fibers a ratio of the length of the secondary axis in the middle of said portion to the length of the secondary axis in the end of said portion is at least 2:1.

10. A sintered highly pourous body according to claim 7, wherein for at least a portion of the fibers a ratio of the length of the secondary axis in the middle of said fibers to the length of the secondary axis in the end of said fibers is at least 3:1.

11. A sintered highly pourous body according to claim 10, wherein at least 20 weight % of said fibers have said at least 3:1 ratio.

12. A sintered highly porous body according to claim 1, wherein the curved sides have recesses running crosswise to the longitudinal axis of the fibers.

13. A sintered highly porous body according to claim 1, further comprising at least one not sintered layer.

14. A sintered highly pourous body according to claim 13, wherein the not sintered layer comprises a perforated plate or a wire fabric formed of like material as the sinterable material.

15. A sintered highly porous body according to claim 1, wherein the body has a pore distribution in a range of approximately 5 to 150 μm.

16. A sintered highly pourous body according to claim 15, wherein the pore distribution is in the range of 10 to 100 μm.

17. A sintered highly porous body according to claim 1, wherein said sinterable material consists of metallic fibers.

18. A sintered highly pourous body according to claim 1, wherein said sinterable material consists of a mixture of powders and fibers.

19. A sintered highly pourous body according to claim 1, wherein the principal axis of the fiber is shorter than approximately 500 μm and the secondary axis is shorter than approximately 100 μm.

20. A sintered highly pourous body according to claim 1, wherein the fibers have different lengths, thereby enhancing stability of a fiber matrix during sintering.

21. A sintered highly pourous body according to claim 1, wherein the fibers are buckled at least once along the longitudinal axis, thereby enhancing interlocking between the fibers.

22. A sintered highly pourous body according to claim 21, wherein at least 20 weight % of the fibers are buckled.

23. A sintered highly pourous body according to claim 1, wherein said body has a porosity of at least 80%.

24. A sintered highly pourous body according to claim 1, wherein said body has a porosity of at least 90%.

25. A sintered highly pourous body according to claim 1, wherein said body has a porosity of at least 93%.

26. A sintered highly pourous body according to claim 23, wherein said body has a substance of at least 50 g/m².

27. A highly pourous combustion element comprising a body having at least one layer made of sinterable material, said material comprising fibers having a hemiellipsoidal cross section on at least one side thereof so as to be curved on one side and largely flat on the other side, at least a portion of said fibers having a principal axis that is shorter than 1 mm and a secondary axis that is shorter than 200 μm, whereby the principal axis is longer than the secondary axis.

28. The combustion element of claim 27 wherein said combustion element is one of an evaporating or wick element in auxiliary heatings and/or additional heatings, a flame support in burners, a heat distributor plate, a combustion supporting element, a heat exchanger and/or a catalyst for heterogeneous reactions.

* * * * *